(12) United States Patent
Wang

(10) Patent No.: US 8,583,094 B2
(45) Date of Patent: Nov. 12, 2013

(54) INCOMING-CALL MANAGEMENT METHOD OF A MOBILE TELECOMMUNICATION DEVICE

(75) Inventor: John C. Wang, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 1278 days.

(21) Appl. No.: 11/781,618

(22) Filed: Jul. 23, 2007

(65) Prior Publication Data

US 2008/0039068 A1    Feb. 14, 2008

(30) Foreign Application Priority Data

Aug. 8, 2006  (TW) .............................. 95129090 A

(51) Int. Cl.
*H04M 3/42* (2006.01)

(52) U.S. Cl.
USPC ................. 455/415; 379/142.01; 379/142.02; 379/142.03; 379/142.04; 379/142.05; 379/142.06; 379/142.07; 379/142.08; 379/142.09; 379/142.1

(58) Field of Classification Search
USPC .......................... 455/415; 379/142.01–142.18
See application file for complete search history.

(56) References Cited

U.S. PATENT DOCUMENTS

| 5,604,791 | A | * | 2/1997 | Lee | 379/88.21 |
| 6,160,877 | A | * | 12/2000 | Tatchell et al. | 379/197 |
| 7,136,472 | B2 | * | 11/2006 | Hill et al. | 379/210.03 |
| 2007/0274488 | A1 | * | 11/2007 | Callaghan | 379/201.01 |

FOREIGN PATENT DOCUMENTS

WO     WO 03/096709     11/2003

* cited by examiner

*Primary Examiner* — Xiang Zhang
*Assistant Examiner* — Edward Zhang
(74) *Attorney, Agent, or Firm* — McClure, Qualey & Rodack, LLP

(57) ABSTRACT

An incoming-call management method of mobile telecommunication devices is provided. The method includes offering options for telephone holder and caller, and controls the procedure according to the telephone holder's setting and caller's decisions.

16 Claims, 3 Drawing Sheets

INCOMING-CALL MANAGEMENT METHOD OF A MOBILE TELECOMMUNICATION DEVICE

RELATED APPLICATIONS

The application claims priority to Taiwan Application Serial Number 95129090, filed Aug. 8, 2006, which is herein incorporated by reference.

BACKGROUND

1. Field of Invention

The present invention relates to an incoming-call management method. More particularly, the present invention relates to an incoming-call management method of a mobile telecommunication device.

2. Description of Related Art

Mobile telecommunication devices are very popular. Moreover, the mobile telecommunication device integrated with the PDA (personal digital assistant), digital camera or media player is a more powerful and popular consumer electronics device.

Although the mobile telecommunication device makes our life convenient, the device sometimes bothers our life. For example, an incoming-call may bother the user of the mobile telecommunication device when the user is watching a movie or holding a meeting. There are many methods available to solve this kind of problem; such as the service of leaving messages offered by the telecom companies. However, these methods can't express whether the incoming-call is urgent and at the same time inform the caller about information rapidly and efficiently without bothering the user. Therefore, we need an incoming-call management method to help users to solve the problem.

SUMMARY

It is therefore an aspect of the present invention to provide an incoming-call management method for users to prevent themselves from being bothered.

It is therefore another aspect of the present invention to provide an incoming-call management method for the user to know whether the incoming-call is urgent.

It is therefore another aspect of the present invention to provide an incoming-call management method for the caller to express whether the incoming-call is urgent.

According to one embodiment of the present invention, an incoming-call management method is used for a user of a mobile telecommunication device to manage an incoming-call during inconvenient times. The method comprises comparing a phone number of the incoming-call with data in a database set in the mobile telecommunication device. When the phone number belongs to the data of a first database group, the user answers the incoming-call; when the phone number does not belonged to the first database group, the method transmits a response to the caller of the incoming-call and requires the caller to select an item in a response. Wherein the responses are: when the caller selects a first item and a first request signal in the response is received, the incoming-call is held on-line, the user answers the incoming-call; when the caller selects a second item and a second request signal in the response is received, the mobile telecommunication device displays a message for remiding of calling back, the user can answers later or does not answer or rejects the incoming-call.

According to another embodiment of the present invention, the method comprises comparing a phone number of the incoming-call with a database set in the mobile telecommunication device. When the phone number belongs to data of a first database group, the user answers the incoming-call and the method disables the sound reception function of the mobile communication device to prevent the caller from hearing the sound of the user's environment. When the phone number belongs to data of a second database group, the method requires the caller of the incoming-call to select a response. The responses are: when the caller selects a first type of response, the user answers the incoming-call and selectively disables the sound reception function of the mobile communication device to prevent the caller from hearing the sound of the user's environment; when the caller selects a second type of response, the user does not answer the incoming-call. When the mobile telecommunication device detects no any response and the phone number does not match the data of a first database group in the database, the mobile telecommunication device records the phone number and calling time of the incoming-call.

In one embodiment of the present invention, the method requires the caller to select a response selected from the group consisting of call waiting, asking the user to call back, leaving a message or leaving missed call information. In another embodiment of the present invention, the method requires the caller to select a response selected from the group consisting of answering the incoming-call and leaving missed call information.

In one embodiment of the present invention, the method comprises following steps, (a) an mobile communication device receives an incoming-call; (b) according to settings in the mobile communication device by the user, the mobile communication device determines whether the user need to answer the incoming-call; (c) according to the setting, the user does not answer the incoming-call, mobile communication device checks whether a information of the incoming-call is available; (d) mobile communication device provides a response to the phone owned by caller and transmitting the incoming-call when the information of the incoming-call is available in the mobile communication device, wherein the response comprises a first type response and second type response; (e) if the caller chooses the first type response and transmits it back, the user answers the incoming-call, and if the caller chooses the second type response and transmits it back, the user does not answer the incoming-call. If the caller chooses the second type response, the caller can further chooses other contents in the second type response, the second type response further comprises a content which is selected from the group consisting of call on-line holding, asking for calling back, leaving a message, answering the incoming-call and leaving missed call information. Therefore, the response comprises a content which is selected from the group consisting of asking answering the incoming-call, call on-line holding, asking for calling back, leaving a message, answering the incoming-call and leaving missed call information.

The response of call on-line holding comprises providing a message for reminding of the incoming-call is on-line for being answered by the mobile communication device. The response of asking for calling back comprises recording the phone number and calling time of the incoming-call and periodically reminding of calling back by the mobile telecommunication device. The response of leaving the message comprises recording the left voice message from the incoming-call in the mobile telecommunication device.

It is to be understood that both the foregoing general description and the following detailed description are examples and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE EMBODIMENTS

Figure 1:
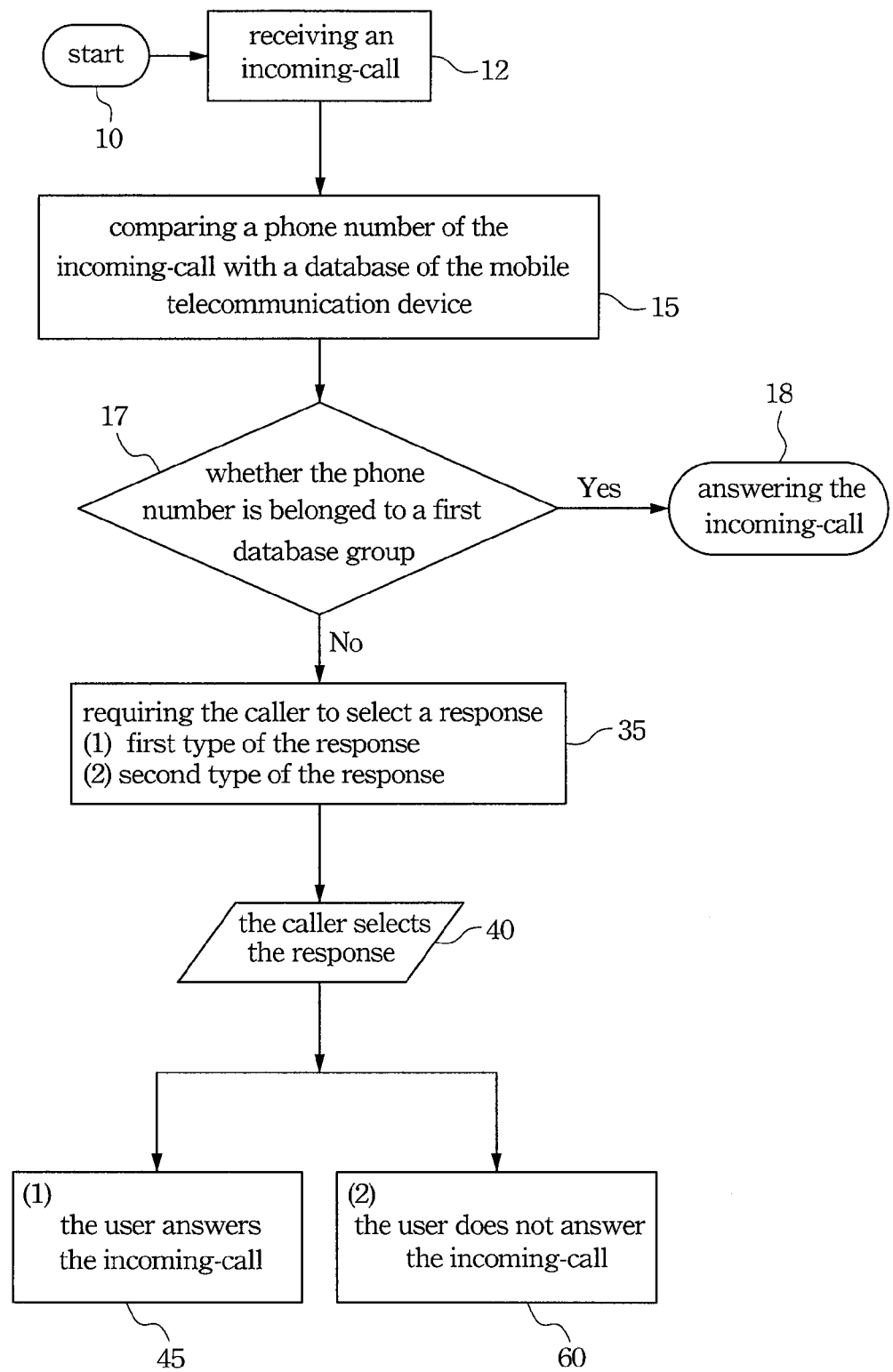
FIG. 1 shows a flow chart of one embodiment of this invention.

Reference will now be made in detail to the present embodiments of the invention, examples of which are illustrated in the accompanying drawings. Wherever possible, the same reference numbers are used in the drawings and the description to refer to the same or like parts.

The presented invention offers an incoming-call management method offering various choices for telephone user and caller to control the procedure according to the telephone user's setting and caller's decisions. The presented invention can filter the phone calls and keep the must-answer calls of important people and urgent cases. Otherwise, when the user answers the incoming-call, the presented invention disables the sound reception function of the mobile communication device to prevent the caller from hearing the sound of the user's environment. The incoming-call management method can be applied to some inconvenient situations, such as meetings, operating theaters, movie theaters or concerts. The following three embodiments are the applications of the incoming-call management method.

FIG. 1 shows a flow chart of one embodiment of this invention. The incoming-call management method manages the incoming-call of a mobile telecommunication device at inconvenient times. After receiving an incoming-call (step 12), the incoming-call management method of this embodiment compares a phone number of the incoming-call with a database of the mobile telecommunication device (step 15) to determine whether the phone number belongs to a first database group (step 17). When the phone number belongs to a first database group, the user answers the incoming-call (step 18). When the phone number does not belong to the first database group, the method of this invention requires the caller to select a response (step 35). Wherein the response has a first type and a second type response. Then, the caller selects the response (step 40). When the caller selects the first type of response, the caller waits on the line for the user to answer the incoming-call (step 45). When the caller selects the second type of response, the user does not answer the incoming-call (step 60).

Phone calls coming from phones with phone numbers in the first database group must be answered. Therefore, the user has to answer the incoming-call at any time when the phones number of the caller is confirmed to be in the first database group.

Otherwise, when the caller selects the first type of response, the caller waits on the line for the user to answer the incoming-call. The mobile telecommunication device provides a message for reminding the user of calling back. At this moment, the user can answer the incoming-call immediately or later.

When the caller selects the second type of response, the caller asks the user to call back. Wherein the second type of response is that the caller can leave a text, a voice or an image message in the mobile telecommunication device to remind or tell the user how to call back.

When answering the incoming-call, the user can transmit the message to the caller not only by speaking, but also by typing or clipping the selection items. Otherwise, when the user answers the incoming-call (such as the conditions of the phone number belonging to a first database group or the caller selects the first type of response), the method of the present invention disables the sound reception function of the mobile communication device to prevent the caller from hearing the sound of the user's environment.

The incoming-call management method of the embodiment further comprises an artificial voice assistant to transform the message of text into a voice message for transmitting out (e.g. to the caller). The artificial voice assistant can make the caller feel like they are talking with a real person.

Otherwise, when the phone number does not belong to the first database group or the caller does not select the first type or second type of response, the mobile telecommunication device records the phone number and calling time of the incoming-call for the user to call back or other use.

Figure 2:
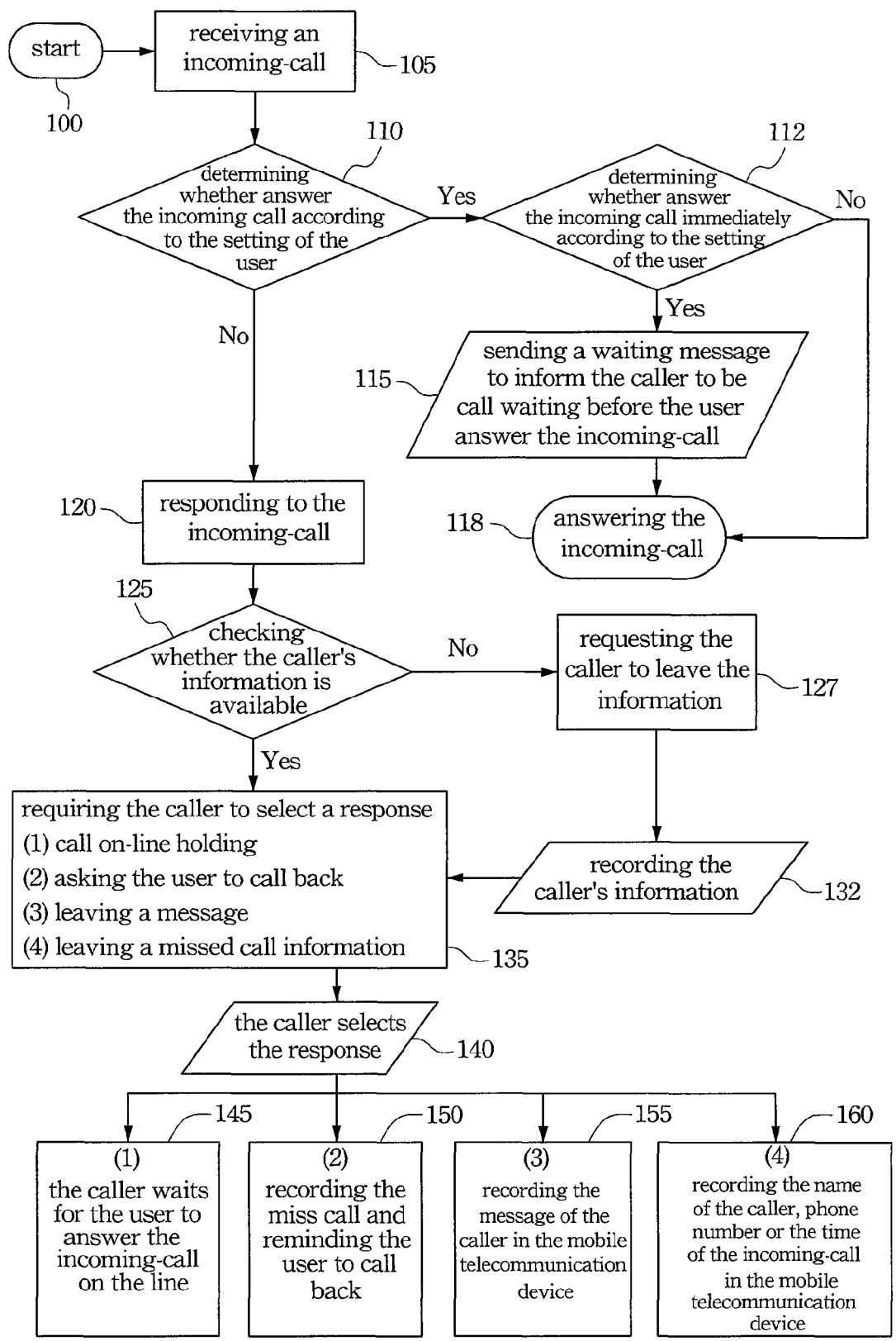
FIG. 2 shows a flow chart of another embodiment of this invention.

FIG. 2 shows a flow chart of another embodiment of this invention. First, after receiving an incoming-call (step 105), the incoming-call management method of this embodiment (such as the artificial voice assistant of the mobile telecommunication device) determines whether to answer the incoming call according to the setting of the user (step 110). When the incoming-call is predetermined to be answered according to the settings, the method further determines whether to answer the incoming call immediately (step 112). When the incoming-call is answered immediately according to the setting, the incoming-call management method reminds the user to answer the incoming-call (step 118). When the incoming-call is not answered according to the setting, the incoming-call management method sends a waiting message to inform the caller to wait on the line before the user answer the incoming-call (step 115).

In the step 110, when the incoming-call is not answered according to the setting, the mobile communication device responds a response to the incoming-call. The response at least has two types. If the caller chooses the first type response, the use need to answer the incoming-call; if the caller chooses the second type response, the mobile communication device checks whether the caller's information is available in the mobile communication device (step 125). When the caller's information is not available, the incoming-call management method requests the caller to leave the caller's information (step 127) and then records the caller's information (step 132) in the mobile communication device, wherein the caller's information is the name of the caller (phone number owner), caller's phone number or the time of the incoming-call or other kinds of contact methods. In the step 125, when the caller's information is available in the mobile communication, the method requires the caller of the incoming-call to select a response. Wherein the response is selected from the group consisting of (1) call on-line holding, (2) asking the user to call back, (3) leaving a message, and (4) leaving missed call information (step 135). Then, the caller selects the response.

When the caller selects (1) call on-line holding, the method reminds the user that the caller waits for the user to answer the incoming-call on the line (step 145). The method reminds the user that the caller is waiting on the line by an image, a sound or a vibration as a periodical reminder.

When the caller selects (2) asking the user to call back, the method records the missed call and reminds the user of calling back (step 150). When the caller selects (3) leaving a message, the method records the message of the caller in the mobile telecommunication device (step 155). When the caller selects (4) leaving missed call information, the method records the name of the caller, phone number or the time of the incoming-call in the mobile telecommunication device (step 160).

It is noted that the method records the message of the caller in the mobile telecommunication device (step 155). Therefore, the user can listen to the message without the service and restrictions of the Telecom companies.

The above description of deciding whether to answer the incoming call (step 110) is used to determine if the phone number belongs to the first group (the phone numbers must be answered) or the second group (non first group).

Moreover, the four steps of waiting for the user to answer the incoming-call on the line (step 145), recording the miss call and reminding the user of calling back (step 150), recording the message of the caller in the mobile telecommunication device (step 155), and recording the name of the caller, phone number or the time of the incoming-call in the mobile telecommunication device (step 160) are the types of responses selected by the caller when the phone number belongs to the second group.

Figure 3:
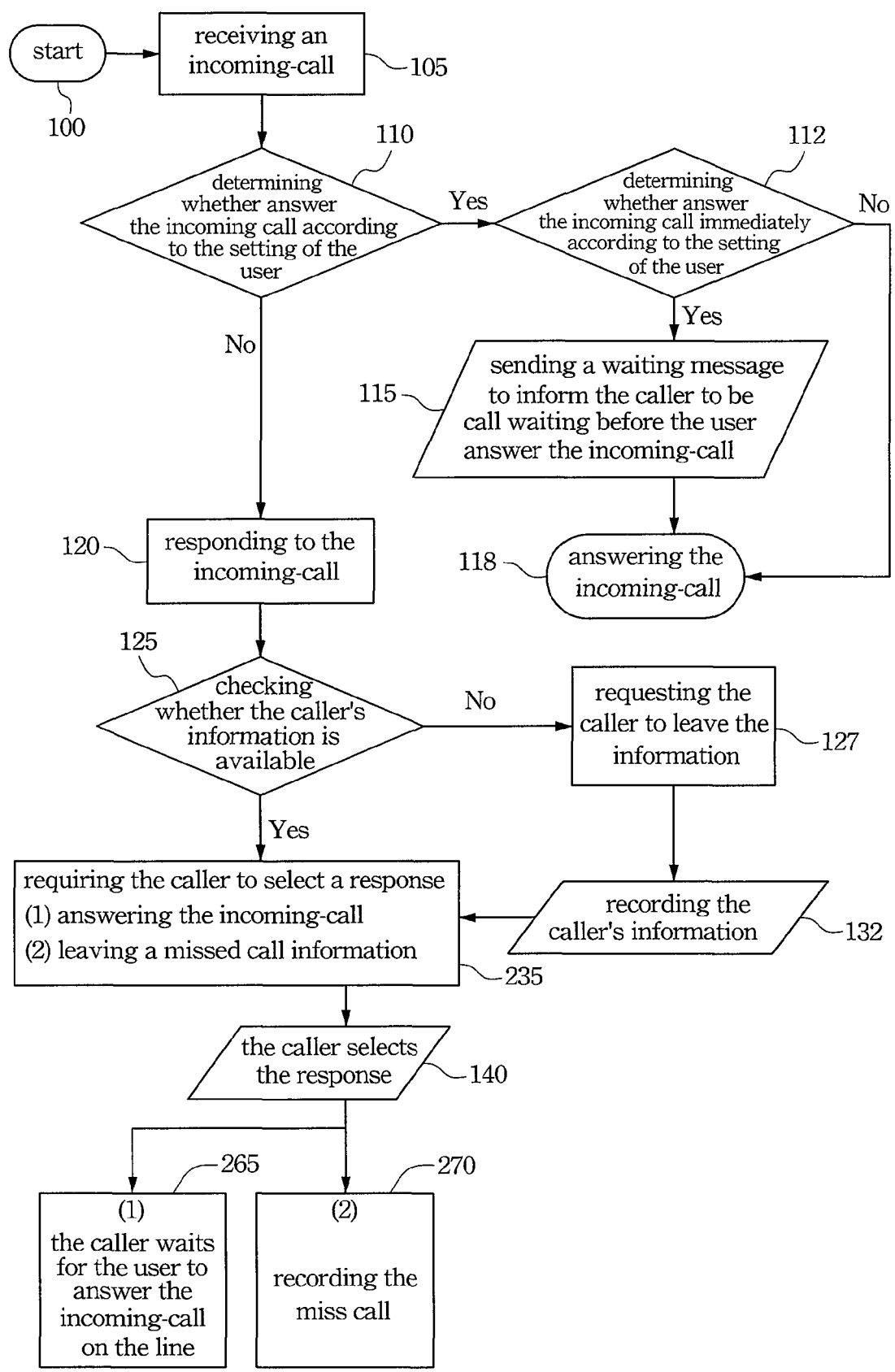
FIG. 3 shows a flow chart of another embodiment of this invention.

FIG. 3 shows a flow chart of another embodiment of this invention. The embodiment is similar to the embodiment of FIG. 2. The difference is that this embodiment changes the response of step 135 in FIG. 2. The embodiment of FIG. 3 requires the caller to select a response. Wherein the response is selected from the group consisting of (1) answering the incoming-call, and (2) leaving missed call information (step 235). When the caller selects (1) answering the incoming-call, the method reminds the user that the caller is waiting for the user to answer the incoming-call on the line (step 265). The method reminds the user that the caller is waiting on the line by an image, a sound or a vibration. When the caller selects (2) leaves missed call information, the method records the miss call (step 270). Moreover, the step 270 further comprises reminding the user to call back, recording the message of the caller in the mobile telecommunication device, or recording the name of the caller, phone number or the time of the incoming-call in the mobile telecommunication device (not shown).

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An incoming-call management method of a mobile telecommunication device, comprising:
    comparing a phone number of a incoming-call from a caller with data in a database of the mobile telecommunication device belonging to a user;
    allowing the incoming call to be answered by the user when the phone number matches the data of a first database group in the database; and
    providing selectable response processes to the caller to select when the phone number does not match the data of the first database group in the database, wherein the response processes comprises:
    waiting the user to allow the incoming call to be answered; and
    ending the incoming call from the caller and leaving missed call information to the user,
    wherein when the response process of ending the incoming call from the caller and leaving missed call information to the user is selected, the mobile telecommunication device records a message of text, voice or image of the incoming-call.

2. The incoming-call management method as claimed in claim 1, wherein the first database group includes the phone numbers must be answered.

3. The incoming-call management method as claimed in claim 1, wherein when waiting the user to allow the incoming-call to be answered is selected, the mobile telecommunication device displays a message for reminding the user.

4. The incoming-call management method as claimed in claim 1, wherein when the incoming-call is answered, a message of text or predetermined option is transmitted to a phone with the phone number of the incoming-call.

5. The incoming-call management method as claimed in claim 1, wherein when the incoming-call is answered, a sound reception function of the mobile communication device is disabled to prevent the sound of the environment is transmitted out.

6. The incoming-call management method as claimed in claim 4, further comprising an artificial voice assistant to transform the message of text to a voice message for transmitting out.

7. The incoming-call management method as claimed in claim 1, wherein when the mobile telecommunication device detects no any response is selected by the caller and the phone number does not match the data of a first database group in the database, the mobile telecommunication device records the phone number and calling time of the incoming-call.

8. An incoming-call management method, comprising:
    (a) receiving an incoming-call from a caller by an mobile communication device belonging to a user;
    (b) comparing a phone number of the incoming-call with data in a database of the mobile telecommunication device;
    (c) allowing the incoming-call to be answered by the user when the phone number matches the data of a first database group in the database; and
    (d) checking whether a information of the incoming-call is available in the mobile communication device, when the phone number does not match the data of the first database group in the database; and
    (e) providing selectable responses to the caller of the incoming-call by the mobile telecommunication device when the information of the incoming-call is available in the mobile communication device, wherein the response processes comprises:
    waiting the user to allow the incoming call to be answered; and
    ending the incoming call from the caller and leaving missed call information to the user,
    wherein when the response process of ending the incoming call from the caller and leaving missed call information to the user is selected, the mobile telecommunication device records a message of text, voice or image of the incoming-call.

9. The incoming-call management method as claimed in claim 8, wherein when allowing the incoming-call being answered by a user, the incoming-call management method further comprises:

determining whether to answer the incoming-call immediately;

sending a message for reminding of answering the incoming-call immediately when the incoming-call is to be answered immediately; and sending a waiting message for asking waiting for being answered before the incoming-call is answered when the incoming-call is not to be answered immediately.

10. The incoming-call management method as claimed in claim 8, wherein when the information is not available in the mobile communication device, the incoming-call information is requested to be left by the incoming-call management method and then executes step (e).

11. The incoming-call management method as claimed in claim 8, wherein the leaving missed call information is the phone number, phone number owner or time of the incoming-call.

12. The incoming-call management method as claimed in claim 8, wherein the selectable responses further comprises call on-line holding, wherein the call on line holding comprises:

providing a message for reminding of the incoming-call is on-line for being answered by the mobile communication device.

13. The incoming-call management method as claimed in claim 12, wherein the message is an image, a sound or a vibration as a periodical reminder.

14. The incoming-call management method as claimed in claim 8, wherein the selectable responses further comprises asking for calling back, wherein the asking for calling back comprises:

recording the phone number and calling time of the incoming-call and periodically reminding of calling back by the mobile telecommunication device.

15. The incoming-call management method as claimed in claim 8, wherein the selectable responses further comprises leaving the message, wherein the leaving the message comprises:

recording the left voice message from the incoming-call in the mobile telecommunication device.

16. The incoming-call management method as claimed in claim 8, wherein the selectable responses further comprises recording incoming-call information, wherein the recording incoming-call information comprises:

recording the phone number, phone number owner of the incoming-call or time of the incoming-call in the mobile telecommunication device.

* * * * *